US011116040B2

(12) United States Patent
Schmelz et al.

(10) Patent No.: US 11,116,040 B2
(45) Date of Patent: Sep. 7, 2021

(54) METHOD OF COORDINATING A COMMUNICATION NETWORK

(71) Applicant: NOKIA SOLUTIONS AND NETWORKS OY, Espoo (FI)

(72) Inventors: Lars Christoph Schmelz, Haar (DE);
Henning Sanneck, Munich (DE);
Haitao Tang, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 58 days.

(21) Appl. No.: 14/896,957

(22) PCT Filed: Jun. 12, 2013

(86) PCT No.: PCT/EP2013/062133
§ 371 (c)(1),
(2) Date: Dec. 9, 2015

(87) PCT Pub. No.: WO2014/198310
PCT Pub. Date: Dec. 18, 2014

(65) Prior Publication Data
US 2016/0157297 A1 Jun. 2, 2016

(51) Int. Cl.
*H04W 84/18* (2009.01)
*H04W 24/02* (2009.01)
(Continued)

(52) U.S. Cl.
CPC ......... *H04W 84/18* (2013.01); *H04L 41/0803* (2013.01); *H04L 43/0876* (2013.01); *H04W 24/02* (2013.01)

(58) Field of Classification Search
None
See application file for complete search history.

(56) References Cited

U.S. PATENT DOCUMENTS

2013/0242720 A1* 9/2013 Chou ................... H04L 5/1446
370/221
2013/0294286 A1* 11/2013 Schmelz .............. H04W 24/02
370/254
(Continued)

FOREIGN PATENT DOCUMENTS

CN 102792720 A 11/2012
EP 2 453 691 A1 5/2012
(Continued)

OTHER PUBLICATIONS

International Search Report and Written Opinion dated Feb. 17, 2014 corresponding to International Patent Application No. PCT/EP2013/062133.
(Continued)

*Primary Examiner* — Jay L Vogel
(74) *Attorney, Agent, or Firm* — Squire Patton Boggs (US) LLP

(57) ABSTRACT

A method of coordinating a communication network comprising a self-coordination network coordinator is provided, wherein the method comprises receiving dynamic context information at the self-coordination network coordinator and performing a coordination of at least one self-organising network function instance based on the received dynamic context information.

11 Claims, 4 Drawing Sheets

(51) Int. Cl.
  *H04L 12/24* (2006.01)
  *H04L 12/26* (2006.01)

(56) References Cited

U.S. PATENT DOCUMENTS

2013/0343252 A1* 12/2013 Chakraborty ..... H04W 52/0261
  370/311
2015/0071118 A1* 3/2015 Sanneck ............. H04L 41/0816
  370/255

FOREIGN PATENT DOCUMENTS

| WO | WO 2012065923 A1 * | 5/2012 | ............ H04W 24/02 |
| WO | WO 2012/143055 A1 | 10/2012 | |
| WO | 2013/071965 A1 | 5/2013 | |
| WO | WO-2013071965 A1 * | 5/2013 | ......... H04L 41/0816 |

OTHER PUBLICATIONS

Huawei et al., "Common SON coordination solution," 3GPP Draft; S5-121302 CR R11 32.522 Common SON Coordination Solution, 3rd Generation Partnership Project (3GPP), 3GPP TSG-5A5 Meeting #83, Sarajevo, Bosnia & Herzegovina, May 11, 2012, XP050647583, 5 pages.

Tobias Bandh et al: "Policy-based coordination and management of SON functions", Integrated Network Management (IM), 2011 IFIP/IEEE International Symposium on, IEEE, May 23, 2011 (May 23, 2011), pp. 827-840, XP032035329, DOI: 10.1109/INM2011.5990492 ISBN: 978-1-4244-9219-0 pp. 830-839.

Barth,U & Kuehn,E 2010 'Self-Organisation in 4G Mobile Networks: Motivation and Vision', 7th International Symposium on Wireless Communication Systems, York, UK, Sep. 2010. pp. 731-735.

Socrates 2011, 'Final Report on Self-Organisation and its Implications in Wireless Access Networks', Deliverable D5.9, INFSO-ICT-216284 Socrates, Jan. 2010, pp. 135.

Schmelz,C, Amirijoo,M, Eisenblaetter,A, Litjens,R, Neuland,M, Turk,J 2011,'A Coordination Framework for Self-Organisation in LTE Networks', IFIP / IEEE Symposium on Integrated Management, Dublin, Ireland, May 2011, 8 pages.

P. Szilágyi, T. Bandh, H. Sanneck, Physical Cell ID Allocation in Multi-layer, Multi-vendor LTE Networks, in 4th International Conference on Mobile Networks and Management, Hamburg, Germany, Sep. 2012, 12 pages.

T. Bandh, L.C. Schmelz, Impact-time Concept for SON-Function Coordination, 2nd International Workshop on Self-Organising Networks (IWSON), Paris, France, Aug. 28, 2012, pp. 16-20.

Chinese Office Action issued in corresponding Chinese Patent Application No. 201380077371.3 dated Jan. 3, 2019.

Chinese Office Action issued in corresponding Chinese Patent Application No. 201380077371.3 dated Sep. 4, 2019.

State Intellectual Property Office, People's Republic of China, Office Action corresponding to Appln. No. 201380077371.3, dated Apr. 3, 2018.

S. Hämäläinen et al., "LTE Self-Organising Networks (SON)—Network Management Automation for Operational Efficiency", Wiley, 2012, Chapter 9, 35 pages.

* cited by examiner

METHOD OF COORDINATING A COMMUNICATION NETWORK

FIELD OF INVENTION

The present invention relates to the field of methods of coordinating a communication network, in particular a mobile communication network. In particular, it relates to a method of coordinating self-organizing network functions. Furthermore, it relates to a coordinator of a communication network, a program element and a computer readable medium.

ART BACKGROUND

A communication network, such as a cellular network, typically comprises a plurality of network elements, e.g. base stations, communicating with each other and with user equipment, e.g. mobile phones, PDAs or laptops, or the like. Self-Organizing Networks (SON) describe a management approach where a set of independently acting self-organizing network function (SON-Function) instances aim at the automation of dedicated network management tasks (network optimisation, network configuration, failure recovery). Each SON-Function instance thereby represents a closed control loop, i.e., the SON-Function instance autonomously collects data (e.g., measurements or Key Performance Indicators), calculates new values for the configuration of the network, and deploys these new values to the network. Furthermore, the SON system includes a function responsible for the coordination between the different independently acting SON-Function instances, denominated as SON-Coordinator or coordination entity, which is responsible for the detection and resolution of (potential) conflicts between the individually acting SON-Function instances. Such conflicts can, e.g., include situations where two different SON-Function instances "concurrently" (i.e., within a certain characteristics time interval, called the "impact time") modify the same configuration parameter, or where one SON-Function instance performs configuration changes in the network such that another SON-Function instance, which currently conducts measurements, receives wrong measurements due to these configuration changes.

In addition to an approach of trying to avoid coordination altogether ("co-design") there are different approaches known to address the required coordination, e.g., "harmonisation" and "virtual locking". For any such "run-time" coordination approach to be able to perform coordination between individually acting SON-Function instances, the SON-Coordinator needs some information about the SON-Functions and their current instantiations. Such information includes, for example:

- The configuration parameters this SON-Function may change (e.g., at the cell or the network element)
- The measurements and/or key performance indicators (KPIs) this SON-Function evaluates
- The temporal scope of the SON-Function instance ("impact-time"), i.e., within which time interval the SON-Function performs one complete re-configuration cycle (taking measurements→calculating new configuration values→deploying configuration values→verification of the changes); the impact-time is necessary to determine if two different SON-Function instances run "concurrently" or not.
- The spatial scope ("impact-area") of the SON-Function (instance), i.e., within which area in the network this SON-Function modifies configuration parameters or takes measurements (e.g., cell, base station, neighbour base stations etc.).

An example of a coordination process in a communication network is schematically shown in FIG. 5. In particular, a schematic view of a SON-Function instantiation process is shown, providing generic and instance-specific information to a SON-Coordinator. The SON-Functions are schematically depicted as 501 and provide generic information 502, like configuration parameters, measurements/key performance indicators, generic impact area, generic impact time and coordination logic, to the SON-Coordinator 503 at design time, which is indicated by arrow 504. The described generic information is stored in a generic database 505 of the SON-Coordinator. The SON-Functions 501 are instantiated at 506 at which point in time instance context information 507 like cell type, location, neighbours and current cell configuration is reported to the SON-Coordinator 503 as well which reporting is indicated by arrow 508. The instance context information 507 is stored in an instance database 509 of the SON-Coordinator. After instantiation SON-Function instance(s) 510 may run on network and/or network element(s) and/or cell(s) 511 which is schematically indicated by arrows 512 between the SON-Function instance(s) 510 and the network elements 511.

For Run-time coordination the SON-Function instance(s) are connected to a coordination engine 513 of the SON-Coordinator 503 which is adapted to perform the coordination of SON-Functions. In particular, the coordination engine uses context information stored in the generic database and in the instance database which is indicated by the arrows 514.

In general, generic impact-area and the generic impact-time of a SON-Function are defined at "design-time" of the SON-Function. They are provided to the SON-Coordinator when the SON-Function is deployed in the network and may conventionally remain fixed as long as this SON-Function is not updated or replaced. Based on this data, and together with the context information provided during SON-Function instantiation (including, for example, information about the location where the SON-Function is instantiated (e.g., cell identifier, network element or network area), the type of the cell where the SON-Function is instantiated (e.g., macro cell or micro cell), or information about neighbours), the SON-Coordinator takes coordination decisions.

SUMMARY OF THE INVENTION

However, there may be a need to provide a method of coordinating a communication network, a coordinator, a computer readable medium and a program element allowing for an improved coordination performance in the communication network.

This need may be met by a method of coordinating a communication network, a coordinator, a computer readable medium and a program element according to the independent claims. Further embodiments are described by the dependent claims.

According to an exemplary aspect a method of coordinating a communication network comprising a self-organizing network coordinator is provided, wherein the method comprises receiving dynamic context information at the self-organizing network coordinator and performing a coordination of at least one self-organising network function instance based on the received dynamic context information.

In particular, the coordinating of the at least one self-organizing network function (SON-Function) comprises an evaluation of the impact of the at least one SON-Function on the performance or operation of another SON-Function.

For example, the SON-Coordinator or SON coordination entity may coordinate a plurality of SON-Functions. In particular, the SON-Coordinator entity may receive the dynamic context information from a database, e.g. a specific dynamic context database.

According to an exemplary aspect a SON-Coordinator is provided, which comprises a receiving unit adapted to receive dynamic context information; and a processing unit adapted to perform a coordination of at least one SON-Function instance based on the received dynamic context information.

In particular, the processing unit may be a coordination engine or computer.

According to an exemplary aspect a program element is provided, which, when being executed by a processor, is adapted to control or carry out a method according to an exemplary aspect.

According to an exemplary aspect a computer-readable medium is provided, in which a computer program is stored which, when being executed by a processor, is adapted to control or carry out a method according to an exemplary aspect.

The term "dynamic context information" may particularly denote any information relating to a context which changes over time. This dynamic context information may be stored in a specific database or may be determined beforehand and transmitted each time the specific dynamic context information is needed.

It should be noted that dynamic context information has to be distinguished from so called generic information, which relates to information which is generic for a specific SON-Function and which is determined once when the SON-Function is created. Examples of generic context information may relate to the configuration parameters, necessary measurements, key performance indicators, generic impact area, generic impact time or coordination logic. Additionally dynamic context information has to be distinguished from the so called instance context information relating to context information which is created once when a SON-Function is instantiated. Examples for such instance context information may be cell type, location, neighbours, and current cell configuration.

The term "SON-Coordinator" or self-organizing network "coordination entity" or "coordinator" may particularly denote an entity which coordinates the operation or functioning of different SON-Functions. In particular, the SON-Coordinator may be adapted or may function in order to prevent that conflicting SON-Functions are deployed at the same time. That is, the SON-Coordinator may function as a monitoring unit adapted to manage and control the deploying and/or operation of SON-Functions. For example, the SON-Coordinator may be adapted to prevent conflicts of SON-Functions, like the case that one SON-Function may try to increase a value of an operation parameter, while another SON-Function may to try to reduce the same parameter at the same time. Another possible conflict may be that one SON-Functions changes a value of an operation parameter which change will affect a measurement, e.g. for determining performance indicators, performed by another SON-Function at the same time a first, or which has an influence on a size of a cell of the communication network.

In particular, a method according to an exemplary aspect may allow for an efficient coordination of different SON-Functions due to the possibility to take into account not only generic information or instantiation information but also some dynamic context information. Thus, it may be possible that dynamic adaptations may be performed, e.g. of the so called impact time or impact area. For example, also the coordination entity may perform some kind of self learning based on former changes of SON-Functions the results or impacts of which are stored in a dynamic context database so that they can be considered later.

Summarizing a gist of an exemplary aspect may be to provide a method of coordinating a communication network wherein an additional database, e.g. a dynamic context database is used to store data or context information which changes over time so that this changing of context information can be taken into account when a decision concerning a potential conflict between different SON-Functions is made. By providing such a dynamic database it may be possible to overcome some difficulties which may otherwise arise, e.g. that:

Some relevant configuration changes may not be known at the coordination level of the SON-Coordinator otherwise, because they are executed not via the coordination or they are executed in a purely local fashion;

Related to the previous point: some (known) configuration changes may trigger other (configuration) changes in the communication network or network elements or system (e.g., establishment of new neighbourships) which are then not known to a SON-Coordinator otherwise;

The impact of a configuration change may not be known in advance and hence some (information based on) post-action measurements needs to be considered at the coordination level otherwise.

Next, further exemplary embodiments of the method of coordinating a communication network are described. However, these embodiments also apply to the coordination entity, the program element, and the computer-readable medium.

According to an exemplary embodiment of the method the dynamic context information is received from a dynamic context database.

In particular, the dynamic context database may be part of the SON-Coordinator or of an entity distinct to the SON-Coordinator, e.g. a part of a SON monitoring and/or verification component or they may act as completely independent functions.

According to an exemplary embodiment the method further comprises updating dynamic context information in the dynamic context database.

In particular, the updating may be performed by a so called updater, i.e. an entity specifically adapted for updating the dynamic context information, e.g. by collecting and analyzing respective information or data from instantiated and/or deployed SON-Functions.

According to an exemplary embodiment of the method the updating of the dynamic context information includes updating information relating to impact time of the at least one SON-Function; impact area of the at least one SON-Function; and/or coordination logic relating to the at least one SON-Function.

According to an exemplary embodiment of the method the coordinating of the at least one SON-Function include the blocking of a request of the at least one SON-Function.

In particular, the blocking of a request may as well include that any information which is not transmitted to another entity by the SON-Coordinator. Additionally or alternatively the blocking of a request may be performed in such a way that a request for deploying a SON-Function instance received by the SON-Coordinator is answered to by a not-acknowledge signal so that the SON-Function is not deployed. In case the SON-Function can be deployed an acknowledge signal may be generated and sent by the SON-Coordinator to the requesting SON-Function.

According to an exemplary embodiment the method further comprises sending current fault data, and/or current performance data, and/or current configuration data to the dynamic context information database.

In particular, these specific data may be stored and/or may be used in order to provide or generate the dynamic context information used afterwards by the SON-Coordinator for coordination.

According to an exemplary embodiment of the method the dynamic context information include tracking information.

In particular, the tracking information being part of the dynamic context information may relate to or may be derivable from:

Tracking changes which are to be deployed into the network through evaluating configuration requests coming from SON-Function instances. It should be noted that this may include other changes from conventional operation, administration and maintenance (OAM) functions and/or manual changes by a human operator;

Tracking present changes which may be deployed to a network and/or network element and/or cell by analysing configuration data from the network and/or network element and/or cell, and/or a configuration management system. It should be noted that some deployed configuration changes may fail or may be overwritten by some other changes, a deployed configuration change may trigger further local autonomic configuration changes, etc.;

Tracking present performance impacts of the configuration changes by analysing performance data from the network and/or network element and/or cell, and/or a performance management system, (when this is combined with knowledge about the prior CM changes this may be called "SON verification",). A dedicated SON monitoring or SON verification component may detect changes in the SON-Function (instance's) impact-time and impact-area, e.g., by analysing measurements coming from network elements (such as base stations) or user equipments, and providing the analysis results to the SON-Coordinator;

Direct interaction with SON-Function instances. For example the SON-Function instance may inform the SON-Coordinator about changes regarding its impact-time and impact-area, for example, by updating neighbourships or timing requirements for measurements or the implementation of configuration changes.

According to an exemplary embodiment of the method the dynamic context information relates to current impact area and/or current impact time and/or current coordination logic.

In particular, the dynamic context information may relate to changes in the initial or generic impact time of a given SON-Function and/or may related to changes in the initial or generic impact area, e.g. due to changes in the environmental condition or to updating of the SON-Function or the operation of the SON-Function. Thus, it may be possible to consider changes or updates in an easy and efficient way. It may even be possible to consider knowledge acquired during earlier SON coordination processes.

The term "current coordination logic" may particularly denote a set of rules or algorithms according which the coordination of the communication network, e.g. of SON-Functions, currently or presently takes place.

The term "impact time" of a SON-Function may particularly denote the time span during which a SON-Function instance is active and during which SON coordination decisions has to consider the specific SON-Function.

The term "impact area" of a SON-Function may particularly denote the area in which a SON-Function instance has influence or impact on other SON-Functions so that it has to be considered in SON coordination or by the SON-Coordinator.

According to an exemplary embodiment of the SON-Coordinator the SON-Coordinator comprises a dynamic context database adapted to store the dynamic context information.

In addition the SON-Coordinator may comprise a dynamic context updater or update entity adapted to update the dynamic context database based on current or present context information.

Summarizing the provision of a method of coordination and a SON-Coordinator according to exemplary embodiments may enable that SON coordination may be always performed on current or present context information which are stored and or received from a dynamic context database which may be provided at a SON-Coordinator or at a distinct entity like an OAM tool. Thus, it may be possible that changes over time may be considered in SON coordination. Examples for changes which may occur during the operation of communication network or the deployment of SON-Functions may be:

Self-healing actions where changes in antenna tilt and transmission power increase or decrease the size of a cell, thereby changing neighbourship relations and modifying also the "impact area mapped on the network" of a SON-Function instance (to be instantiated after the change has taken place). According to an exemplary embodiment it may be possible to take this information explicitly into account (and not only implicitly by SON-Function instances change requests based on the new information).

SON-Function instances collecting measurements from the network and from user equipments may require a different measurement time at night (due to a lack of users and hence a lack of statistically relevant measurements). In particular the measurement time may be defined adaptively in terms of their statistical relevance, i.e., based on the number of samples, without necessarily making the SON configuration change patterns and thus may avoid that overall SON-Function instance behaviour gets rather unpredictable and thus may enable that it is applicable in all or at least most scenarios. Thus, also changing coordination parameters dependent on the time of day may be considerable.

The pre-defined (vendor-supplied) coordination logic needs adaptation over time, e.g., if new SON-Function types or new SON-Functions from other vendors are introduced. Also, adaptation may be triggered from operational knowledge acquired from the specific deployment. With respect to this change a method according to an exemplary embodiment may allow for an all machine- or tool-supported process.

In general the methods according to exemplary embodiments may allow for to update or modify initial generic information which is characteristic to the SON-Function type (impact-area, impact-time, (part of the) coordination logic) during operation in an easy an efficient manner. Thus, the problems of a fixed definition of the generic impact-time and generic impact-area of a SON-Function at deployment, e.g. that changes can hardly be implemented in the system, may be avoided. This may lead to an improved coordination of SON-Functions since these changes over time may be considered. Thus, it may not be necessary to define impact-time and impact-area sufficiently large such that the SON-Coordinator can detect and resolve the conflicts in any case which may lead otherwise to an inefficient operation of the SON system as a whole.

The aspects and exemplary embodiments defined above and further aspects of the invention are apparent from the example of embodiment to be described hereinafter and are explained with reference to these examples of embodiment.

DETAILED DESCRIPTION

Figure 1:
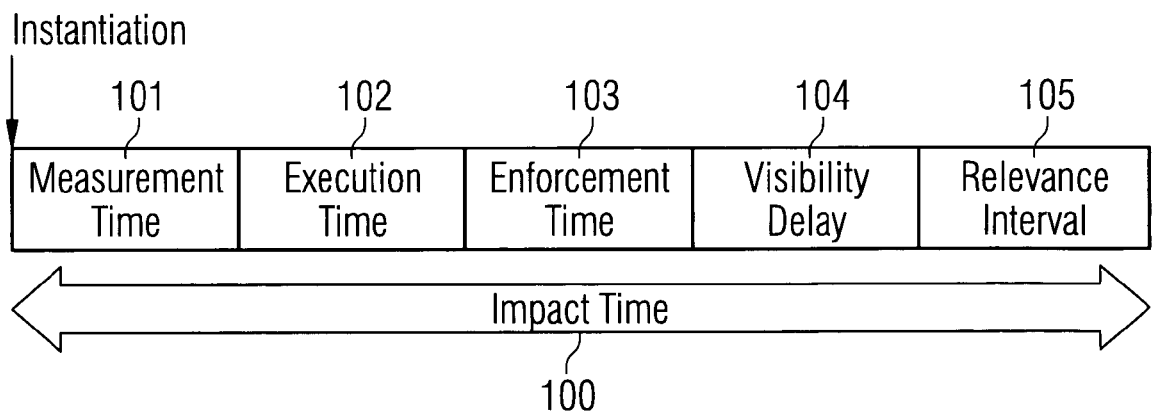
FIG. 1 schematically shows details of an impact time.

The illustration in the drawing is schematic.

In the following a detailed description of exemplary embodiments is given. In particular, a detailed description with respect to the term "impact time" will be given in the beginning.

A self-organizing network (SON) function instance is advantageously considered by SON coordination decisions during the complete time period during which the SON-Function is active. This time period is denominated as impact time. FIG. 1 schematically shows the components of the impact-time 100:

Measurement time 101: the time during which a SON-Function instance collects measurements, or monitors measurements and KPIs in order to detect a trigger situation, or to use the collected measurements as input to the SON algorithm.

Execution time 102: the time during which the actual SON algorithm is running in order to compute new configuration parameter values.

Enforcement time 103: the time during which the newly computed configuration parameter values are deployed to the network (cell, network element (NE)). This may take some time, depending on the mechanisms used to deploy the values. The enforcement time finishes when the acknowledgement for the changes arrives at the mechanism used to deploy the changes.

Visibility delay 104: the time required until changes performed by the SON-Function instance at the target become fully visible in the corresponding measurements. In particular considering standard performance management mechanisms (measurements granularity period) there may be a considerable delay until a complete granularity period of measurements reflects the configuration parameter changes.

Relevance interval 105: the time during which changes performed by a SON-Function instance are relevant for subsequently active SON-Function instances. The relevance interval may be rather long depending on the requirements regarding the prevention of oscillations.

It should be noted that the impact time may be assigned in a pair-wise way (i.e., related to pairs of SON-Function types).

Furthermore, a detailed description with respect to the term "impact area" will be given in the following.

Figure 2A:
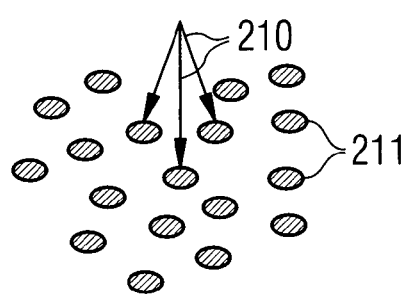
FIG. 2 schematically shows details of an impact area.

FIG. 2A to FIG. 2D schematically show concepts relating to the impact-area:

FIG. 2A shows the function area indicated by the arrows 210 or dots to which the arrows 210 points, i.e., the area where actual changes should be performed, wherein the dots 211 schematically depicts locations or places at which SON-Functions instances are running, e.g. basis stations of cells of a communication network. It should be noted that the function area can be seen as a generic characteristic of the specific SON-Function type, e.g., Mobility Robustness Optimisation SON-Function changing cell pairs, Cell Outage Compensation SON-Function changing a cell cluster around a failed cell, Coverage and Capacity Optimisation (CCO)SON-Function changing individual cells.

Figure 2B:
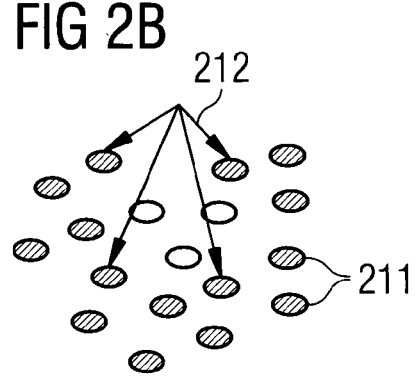

FIG. 2B schematically shows the input area indicated by the arrows 212, i.e., the generic area where Performance Management (PM), Configuration Management (CM), Fault Management (FM) inputs are collected in order to perform the SON-Function (e.g., while a CCO function is changing only an individual cell it should consider the states of all surrounding cells to be able to perform a meaningful decision).

Figure 2C:
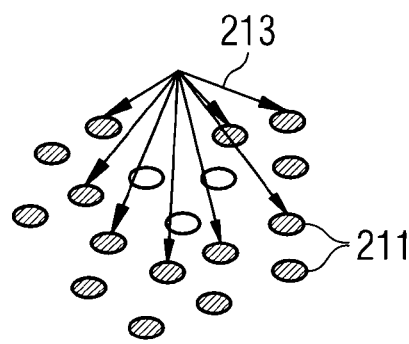

FIG. 2C schematically shows the effect area indicated by the arrows 213, which is the area in which measurable (i.e., PM, but potentially also CM and FM) may be produced by execution a SON-Function instanced-induced configuration change.

Figure 2D:
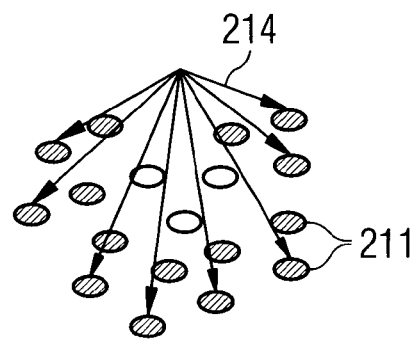

FIG. 2D schematically shows a safety margin extending the effect area and indicated by the arrows 214, which may be beneficial regarding future similar changes. This may be in particular advantageous with respect to Physical Cell Identity SON-Function changes.

Figure 3A:
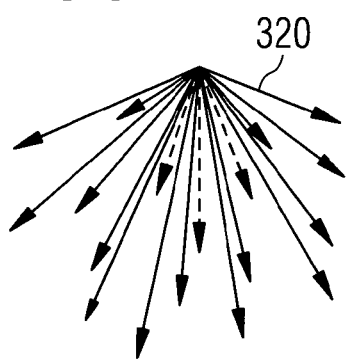
FIG. 3 schematically shows details of a mapping of design time impact area to the actual impact time at run-time.
Figure 3B:
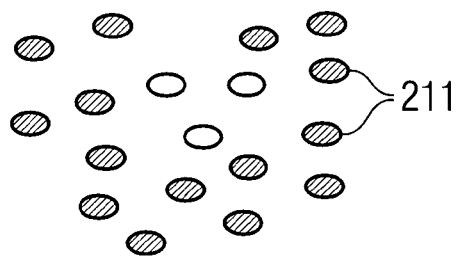
Figure 3C:
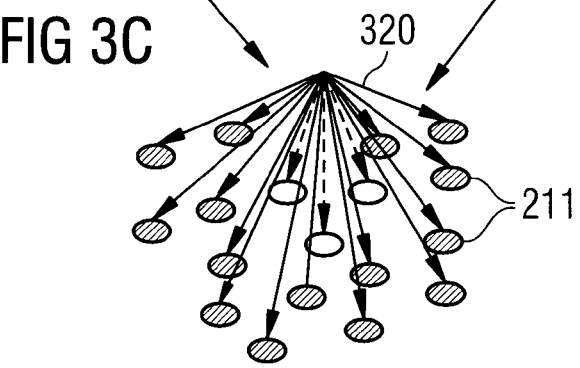

FIG. 3A to FIG. 3C schematically show the mapping of the generic impact-area defined at design-time to the actual impact-area of a SON-Function at run-time. This mapping is performed within a SON-Coordinator or SON-coordination entity during the instantiation of the SON-Function. In a similar way the mapping of the impact-time may be performed.

In particular, FIG. 3A schematically show the generic impact area 320 indicated by a set of arrows corresponding to the arrows in FIGS. 2A to 2D, while FIG. 3B schematically depicts the cells 211 building or forming the communication network and illustrating the network deployment with indicated function area 210. FIG. 3C schematically depicts the impact-area of FIG. 3A mapped on the communication network of FIG. 3B. This mapping may be done by mapping the "design-time" impact-area (shown in FIG. 3A) to the actual impact-area at "run-time" (shown in FIG. 3B), i.e., when a function instance is initialised.

Figure 4:
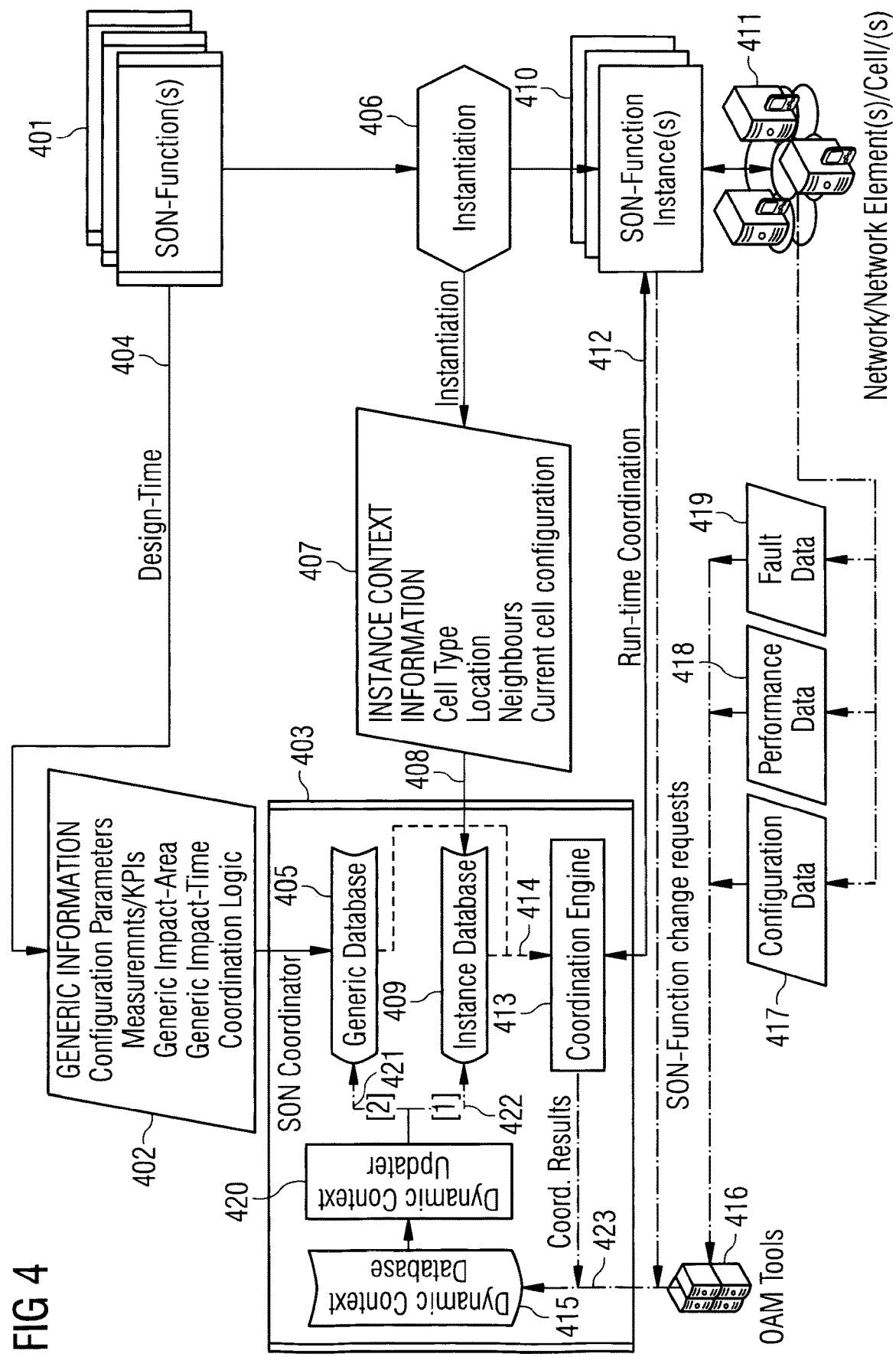
FIG. 4 schematically shows of a SON coordination according to an exemplary embodiment.

An example of a coordination process in a communication network according to an exemplary embodiment is schematically shown in FIG. 4. In particular, a schematic view of SON-Function instantiation process is shown providing generic and instance-specific information to a SON-Coordinator. The SON-Functions are schematically depicted as 401 and provide generic information 402, like configuration parameters, measurements/key performance indicators, generic impact area, generic impact time and coordination logic, to the SON-Coordinator 403 at design time, which is indicated by arrow 404. The described generic information is stored in a generic database 405 of the SON-Coordinator. The SON-Functions 401 are instantiated at 406 at which time instance context information 407 like cell type, location, neighbours and current cell configuration is reported to the SON-Coordinator 403 as well which is indicated by arrow 408. The instance context information 407 is stored in an instance database 409 of the SON-Coordinator. After instantiation SON-Function instance(s) 410 may run on network and/or network element(s) and/or cell(s) 411 which is schematically indicated by arrows 412 between the SON-Function instance(s) 410 and the network elements 411.

For Run-time coordination the SON-Function instance(s) are connected to a coordination engine 413 of the SON-Coordinator 403 which is adapted to perform the coordination of SON-Functions. In particular, the coordination engine uses context information stored in the generic database and in the instance database which is indicated by the arrows 414.

However, the SON-Coordinator 403 according to the exemplary embodiment of FIG. 4 further includes a further database, namely a dynamic context database 415 in which dynamic context is stored, which may be collected via OAM tools 416 and include current configuration data 417, current performance data 418 and current fault data 419 collected by the Operation, Administration and Maintenance (OAM) tool from the network and/or network element(s) and/or cell(s) 411.

In addition a dynamic context updater 420 is provided at the SON-Coordinator 403 which gets its context information from the dynamic context database. The content, i.e. the dynamic context information stored in the dynamic context database may be used to update or modify the generic database 405 or the content of the same and/or of the instance database 406 which is indicated by the arrows 421 and 422, respectively. In particular, the context information for the dynamic update may further be used to evaluate correctness of the current generic information (e.g. by some machine learning technology) as indicated by arrow 422. In general, the dynamic context information may be used when performing a coordination function or decision of the SON-Coordinator 403.

Figure 5:
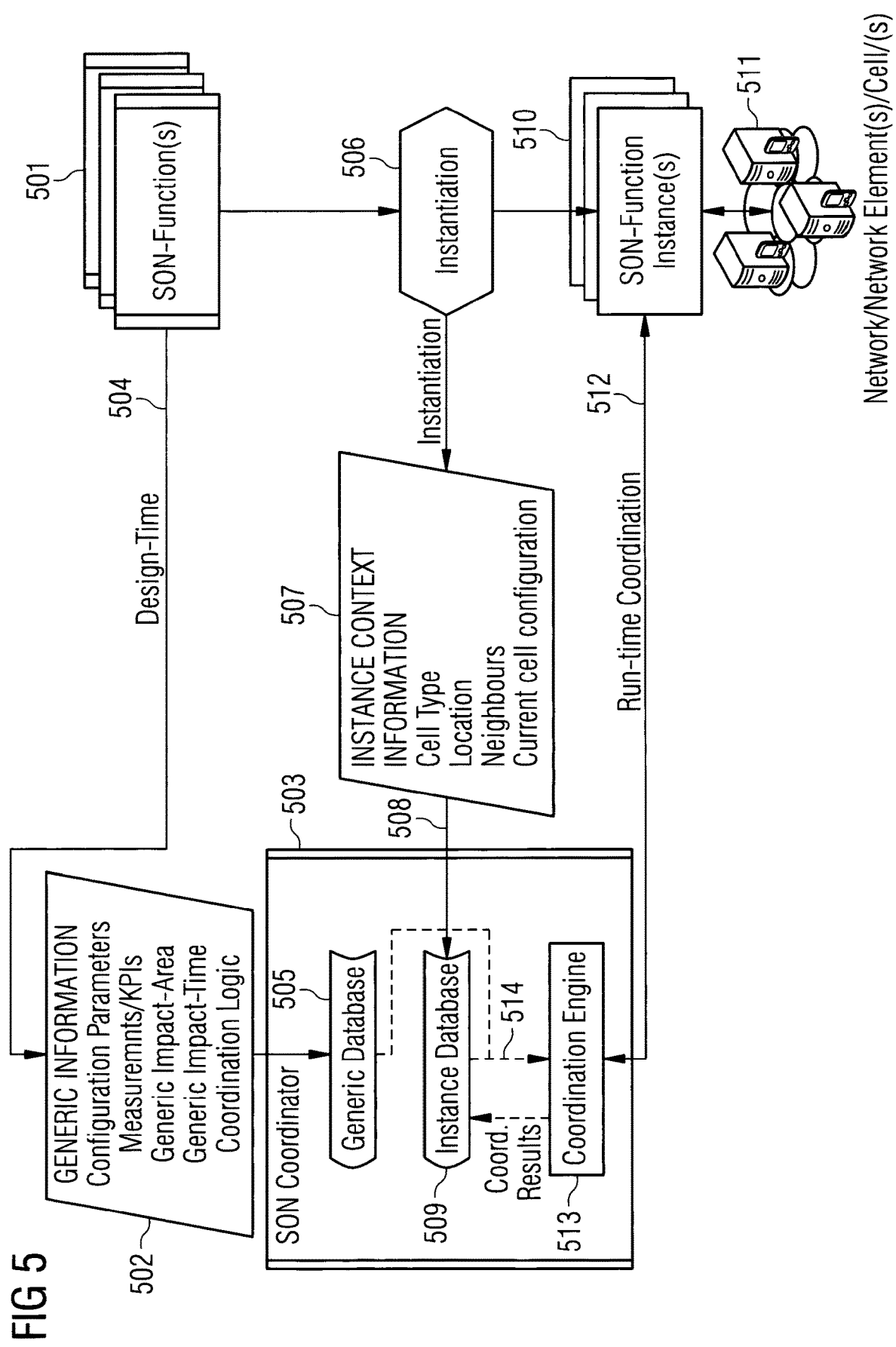
FIG. 5 schematically shows a comparative SON instantiation process.

As in the example of FIG. 5 described above the coordination may be performed by the coordination engine which may store its coordination results also in the dynamic context database indicated by arrows 423.

It should be noted that the update process of the generic database and/or instance database may be performed in a pull fashion by the SON-Coordinator, i.e. on request of the SON-Coordinator and/or in a push fashion, i.e. may be initiated by the OAM tool, for example. Furthermore, the dynamic context database and/or the dynamic context updated may reside at the SON-Coordinator or SON coordination site (as shown in FIG. 4) or may be part of the OAM tool or may reside at the site of the OAM tool or even a further specific site dedicated for this purpose.

Compared to the comparative example shown in FIG. 5 the schematic SON coordination using dynamic context data according to an exemplary embodiment of FIG. 4 shows the additional functional components of the SON-Coordinator that may enable a dynamic update of the context information for SON-Functions and/or function instances during run-time. For example, the SON-Coordinator may comprise interfaces adapted to communicate directly with network elements deploying SON-Functions in order to receive updated current information.

Also the data sources for this context information update are displayed. Based on this dynamic context information, it may be possible to base SON coordination decisions on the most recent network and SON-Function instances' status and not only on the initial generic information, the context information provided during function instantiation and the ongoing coordination results. In addition or alternatively to tracking the coordination result events, the "context information" may be updated by using all or a subset of the information below:

Tracking changes which are to be deployed into the network through evaluating configuration requests from SON-Function instances;
Tracking actual changes which have been deployed to the network and/or network element and/or cell;
Tracking actual performance impacts of the configuration changes by analyzing performance data from a network element;
Direct interaction with SON-Function instances.

All of the above information is typically already available from Operation, Administration and Maintenance (OAM) tools. However, it may be advantageous to exploit this information with respect to the dynamic coordination process (cf. arrow 421 in FIG. 4). The actual update process may be done in either a pull (by the SON-Coordinator) or push (by the corresponding OAM tool) fashion.

The described interfaces, database and dynamic context updater entity may allow the SON-Coordinator to dynamically track the changes in the managed system (the communication network) which are related to the context information required to drive the coordination logic and thus is related to the actual coordination decisions.

The options for the information collection described above have different requirements on implementation:

Direct interaction with SON-Function instances: Since the SON-Function instance detects and/or considers itself the necessity to change its impact-time and impact-area, the corresponding information may be provided rather quickly to the SON-Coordinator, allowing a fast reaction. However, this requires the implementation of a dedicated interface between the SON-Function instance and the SON-Coordinator in order to enable the information exchange.
Tracking the actual performance impacts of the configuration changes: A dedicated SON monitoring and/or verification component will need to be implemented. This component may react slower than the SON-Function instance itself (cf. option above) since the corresponding measurements may first need to be analysed. However, there is no additional interface required between the SON-Function instance and the SON-Coordinator, which is an advantage in case of $3^{rd}$ party SON-Function deployments. This SON monitoring and/or verification component may be part of the OAM tools as depicted in FIG. 4.

It should be noted that the dynamic context database, and the dynamic context updater, as shown in FIG. 4, may also be entities outside the actual SON-Coordinator. For example, they can be part of the SON monitoring and/or verification component or entity, or they can act as completely independent functions.

A method according to an exemplary embodiment may provide the advantage that regarding the adaptation of the coordination logic, the dynamic context updater could be used to collect information on the applicability of existing coordination logic in a real environment.

Furthermore, it might also help if coordination logic is missing for new SON-Functions. Furthermore, the method may be combined with (or is part of) a "SON-Function meta data concept" (i.e., SON-Functions can be plugged into the system and/or the SON-Coordinator dynamically) where the metadata template includes the set of parameters mentioned in the background section. Moreover, the dynamic context updater may allow an easy interaction with a human operator by adding a corresponding interface, for example, to enable the operator to learn from context modifications in the generic or instance databases and accordingly update "default" information for SON-Functions for future implementations, or to allow a confirmation process in case the dynamic context updater wants to modify data in the generic or instance database Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

LIST OF REFERENCE SIGNS

101 Impact time
102 Measurement time
103 Enforcement time
104 Visibility delay
105 Relevance interval
210 Function area
211 Cell(s)
212 Input area
213 Effect area
214 Margin area
320 Generic impact area
401 SON-Function(s)
402 Generic information
403 SON-Coordinator
404 Providing generic information
405 Generic database
406 Instantiation
407 Instance context information
408 Reporting instance context information
409 Instance database
410 SON-Function instance(s)
411 Network element(s)
412 Run-time coordination
413 Coordination engine
414 Arrows
415 Dynamic context database
416 OAM tools
417 Current configuration data
418 Current performance data
419 Current fault data
420 Dynamic context updater
421 Updating generic database
422 Updating instance database
423 Storing coordination results
501 SON-Function(s)
502 Generic information
503 SON-Coordinator
504 Providing generic information
505 Generic database
506 Instantiation
507 Instance context information
508 Reporting instance context information
509 Instance database
510 SON-Function instance(s)
511 Network element(s)
512 Run-time coordination
513 Coordination engine
514 Arrows

The invention claimed is:

1. A method of coordinating a communication network comprising a self-organizing network coordinator, the method comprising:
receiving, from a dynamic context database, dynamic context information at the self-organizing network coordinator associated with at least one self-organizing network function instance and another at least one self-organizing network function instance, the dynamic context information comprising a current impact area of the at least one self-organizing network function instance and the another at least one self-organizing network function instance, wherein the current impact area is an area in which the at least one self-organizing network function instance has influence or impact on the another at least one self-organizing network function instance;
determining based on the dynamic context information a conflicting impact of the at least one self-organizing network function instance on a performance of operation of the another at least one self-organizing network function instance;
performing a coordination of the at least one self-organizing network function instance to prevent the conflicting impact; and
updating the dynamic context information.

2. The method according to claim 1, further comprising updating the dynamic context information in the dynamic context database.

3. The method according to claim 1, wherein the coordinating of the at least one self-organising network function instance includes blocking or discarding a request of the at least one self-organizing network function instance.

4. The method according to claim 1, further comprising:
sending at least one of current fault data, current performance data, or current configuration data to the dynamic context database.

5. The method according to claim 1, wherein the dynamic context information includes tracking information.

6. A self-organizing network coordinator comprising:
at least one processor, wherein the at least one processor is configured to cause the apparatus at least to:
receive, from a dynamic context database, dynamic context information associated with at least one self-organizing network function instance and another at least one self-organizing network function instance, the dynamic context information comprising a current impact area of the at least one self-organizing network function instance and the another at least one self-organizing network function instance, wherein the current impact area is an area in which the at least one self-organizing network function instance has influence or impact on the another at least one self-organizing network function instance;

determine based on the dynamic context information a conflicting impact of the at least one self-organizing network function instance on a performance of operation of the another at least one self-organizing network function instance;

perform a coordination of the at least one self-organizing network function instance to prevent the conflicting impact; and update the dynamic context information.

7. The self-organizing coordinator according to claim 6, wherein the self-organizing network coordinator comprises the dynamic context database configured to store the dynamic context information.

8. The self-organizing network coordinator according to claim 6, wherein the at least one processor is configured to cause the apparatus at least to update the dynamic context information in the dynamic context database.

9. The self-organizing network coordinator according to claim 6, wherein the coordination of the at least one self-organizing network function instance includes blocking or discarding a request of the at least one self-organizing network function instance.

10. The self-organizing network coordinator according to claim 6, wherein the at least one processor is configured to cause the apparatus at least to send at least one of current fault data, current performance data, or current configuration data to the dynamic context database.

11. The self-organizing network coordinator according to claim 6, wherein the dynamic context information includes tracking information.

* * * * *